US008922334B2

(12) United States Patent
Hale et al.

(10) Patent No.: US 8,922,334 B2
(45) Date of Patent: Dec. 30, 2014

(54) ASSISTED REMOTE CONTROL MACROS

(75) Inventors: Nathan Hale, Denver, CO (US); David A. Innes, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 809 days.

(21) Appl. No.: 12/834,402

(22) Filed: Jul. 12, 2010

(65) Prior Publication Data

US 2012/0007763 A1 Jan. 12, 2012

(51) Int. Cl.
*G08C 19/00* (2006.01)
*H04L 12/28* (2006.01)
*G06F 3/023* (2006.01)
*G06F 3/038* (2013.01)
*G08C 17/02* (2006.01)
*G08C 23/04* (2006.01)
*H04N 5/44* (2011.01)
*H04N 21/422* (2011.01)

(52) U.S. Cl.
CPC ............ *H04L 12/2814* (2013.01); *G06F 3/023* (2013.01); *G06F 3/038* (2013.01); *G08C 17/02* (2013.01); *G08C 23/04* (2013.01); *H04L 12/282* (2013.01); *H04N 5/4403* (2013.01); *H04N 21/42226* (2013.01); *G08C 2201/33* (2013.01); *H04N 2005/4439* (2013.01)
USPC .................... 340/5.22; 340/12.22; 340/12.24; 340/4.31; 340/1.1

(58) Field of Classification Search
USPC .................. 340/5.22, 12.22, 12.24, 4.31, 1.1
See application file for complete search history.

(56) References Cited

U.S. PATENT DOCUMENTS

| 6,571,299 | B1 * | 5/2003 | Schroyer et al. ................ 710/6 |
| 6,690,392 | B1 * | 2/2004 | Wugoski ...................... 715/744 |
| 6,909,378 | B1 * | 6/2005 | Lambrechts et al. ........ 340/4.32 |
| 7,218,243 | B2 * | 5/2007 | Hayes et al. .............. 340/12.25 |
| 7,330,174 | B2 * | 2/2008 | du Breuil ...................... 345/107 |
| 7,525,473 | B2 * | 4/2009 | Chu et al. ..................... 341/176 |
| 7,589,642 | B1 * | 9/2009 | Mui ............................ 340/12.3 |
| 2005/0110652 | A1 * | 5/2005 | Becker et al. ............ 340/825.72 |
| 2006/0145911 | A1 * | 7/2006 | Kim .............................. 341/176 |
| 2006/0267741 | A1 * | 11/2006 | Park et al. ................ 340/310.11 |
| 2007/0296552 | A1 * | 12/2007 | Huang et al. ................. 340/10.5 |
| 2008/0003993 | A1 * | 1/2008 | Rye et al. ...................... 455/418 |
| 2008/0228289 | A1 * | 9/2008 | Hwang et al. ..................... 700/3 |
| 2009/0144621 | A1 * | 6/2009 | Sangster et al. .............. 715/704 |
| 2010/0217407 | A1 * | 8/2010 | Hwang et al. ................... 700/23 |
| 2011/0131450 | A1 * | 6/2011 | Wheeler et al. ................ 714/32 |

* cited by examiner

*Primary Examiner* — George Bugg
*Assistant Examiner* — Naomi Small
(74) *Attorney, Agent, or Firm* — Seed IP Law Group PLLC (57) ABSTRACT

A receiver interacts with a remote control to assist with one or more user-defined macros. In a first embodiment, the receiver may execute a macro recording program to record user input and create a macro based at least partially thereon. The receiver may associate the macro with a remote control selection element or a menu element of a menu operable to be displayed by the receiver on a display. The receiver may also transmit the macro to a storage medium. Subsequently, the user may trigger execution of the macro by the remote control or the receiver. In executing the macro, the remote control or the receiver may transmit instructions to entertainment system components or may signal the other to do so. In a second embodiment, the remote control may record the macro transmit it to the receiver for storage.

15 Claims, 5 Drawing Sheets

ASSISTED REMOTE CONTROL MACROS

FIELD OF THE INVENTION

This disclosure relates generally to user-defined remote control macros, and more specifically to receivers assisting with user-defined remote control macros.

SUMMARY

The present disclosure discusses assisted remote control macros. A receiver interacts with a remote control device to assist the remote control with one or more user-defined macros. The receiver may provide assistance with recording macros, storing macros, executing macros, and so on.

In a first embodiment, the receiver may execute a macro recording program to record user input. The user input may specify a sequence of actions to include in a user-defined macro. After recording the user input, the receiver may create a macro based at least partially thereon. The receiver may associate the created macro with a button or other selection element of the remote control device and/or a menu element of a menu operable to be displayed by the receiver on a display device. The receiver may also transmit the created macro to a storage medium for storage.

Subsequently, the user may trigger execution of the stored macro. In some implementations, the remote control device may execute the stored macro. In such implementations, if the stored macro is stored in the receiver, the remote control device may request and receive the stored macro before execution. In executing the macro, the remote control device may transmit instructions to one or more entertainment system components and/or may signal the receiver to do so.

In other implementations, the receiver may execute the stored macro. In these implementations, if the stored macro is stored in the remote control device, the receiver may request and receive the stored macro before execution. In executing the macro, the receiver may transmit instructions to one or more entertainment system components and/or may signal the remote control device to do so.

In a second embodiment, the remote control device may execute a macro recording program to record user input. After recording the user input, the remote control device may create a macro based at least partially thereon. The remote control device may associate the created macro with a button or selection element of the remote control device and/or a menu element of a menu operable to be displayed by the receiver on a display device. The remote control device may also transmit the created macro to the receiver for storage.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems and methods that embody various elements of the present disclosure. However, it should be understood that the described disclosure may be practiced in a variety of forms in addition to those described herein.

Receivers, such as programming receivers, television receivers, set top boxes, digital video recorders, and so on, process programming content for display on associated display devices. The operation of many receivers may be directed by users via a remote control device. Such remote control devices may include predefined buttons and/or other selection elements for turning on and off the receiver, selecting channels, ordering and/or viewing on demand programming content, and so on.

Additionally, the receivers may be part of an entertainment system that includes a variety of different component devices (such as one or more receivers, digital versatile disc players, video cassette recorders, laser disc players, blue-ray disc players, high-definition DVD players, digital video recorders, video game systems, surround sound systems, audio systems, televisions, and so on) which may be utilized together in various combinations at various times. For example, a user of such an entertainment system may utilize a digital versatile disc (DVD) player, a surround sound system, and a television together in order to watch a DVD movie. By way of a second example, the user may utilize a receiver and a television together in order to watch television programming received from a television programming provider. A remote control device that is operable to direct the operation of a receiver in such an entertainment system may also include predefined buttons and/or other selection elements for directing the operations of one or more of the other component devices of the entertainment system. By providing a remote control device operable to direct the operations of multiple component devices in the entertainment system, a user may be able to utilize multiple component devices without having to operate separate remote control devices for each.

In addition to providing predefined remote control functions to a user, a remote control device may be programmable by the user to store and perform one or more user-defined macros. A user-defined macro is a recorded sequence of user selected buttons, selection elements, and so on that performs a set of actions typically related to one or more commonly performed tasks. In response to user input, the remote control typically records, stores, and associates the macro with a button or other selection element of the remote control. When the user later selects the associated button or other selection element, the macro is triggered. The remote control then executes the macro, replaying the recorded sequence of buttons, selection elements, and so on. By recording the user selections as a macro, the user may initiate multiple commands by selecting only the associated selection element rather than the entire sequence each time the user desires the set of actions to be performed.

By way of example, a user may have an entertainment system that includes a television, a DVD player, an audio component, and a set top box that includes a remote control. In this example, if the user desires to watch television, the set top box and the television may need to be powered on and the television may need to be set to a first input. In this first configuration, the television may receive and display video and/or audio for television programming from the set top box. Also in this example, if the user desired to watch a DVD, the DVD player, the television, and the audio component may all need to be powered on. Then, the television may need to be set to a second input and the audio component may need to be set to a first input. In this second configuration the television may receive and display video from the DVD player and the audio component may receive and play audio from the DVD player through one or more speakers.

Typically, when the user desires to watch television, he may have to select a first sequence of buttons and/or selection elements on the remote control to configure the entertainment system to the first configuration. When the user desires to watch a DVD, the user may have to select a second sequence of buttons and/or selection elements on the remote control to configure the entertainment system to the second configuration. However, rather than selecting all of the different buttons and/or selection elements each time to switch between the first configuration and the second configuration, the user may record each sequence as a separate macro. The user may associate each macro with a particular selection element, such as a button on the remote. Then, the user may press the appropriate selection element to trigger the appropriate macro when the user either wishes to watch television or DVDs.

Generally, a remote control requires resources to record, store, and/or execute user-defined macros. These resources may include memory or other storage medium to store macros and/or a macro recording program, processing unit time to execute the macros or the macro recording program, and so on. Particularly considering to the relatively small size and weight constraints of remote control devices, these resources are finite. Thus, only so many macros can be recorded, stored, and/or executed by a remote control device. Further, every macro that is so recorded, stored, and/or executed utilizes resources that could be otherwise used for other remote control functions.

Accordingly, in certain embodiments discussed herein a receiver may facilitate creating, storing, and/or executing remote control macros. The receiver interacts with a remote control device to assist the remote control with one or more user-defined macros. In this way, the burden of the macros is not solely borne by the remote control device, thus freeing resources of the remote control device and/or enabling use of macros beyond the sole capabilities of the remote control device.

Figure 1:
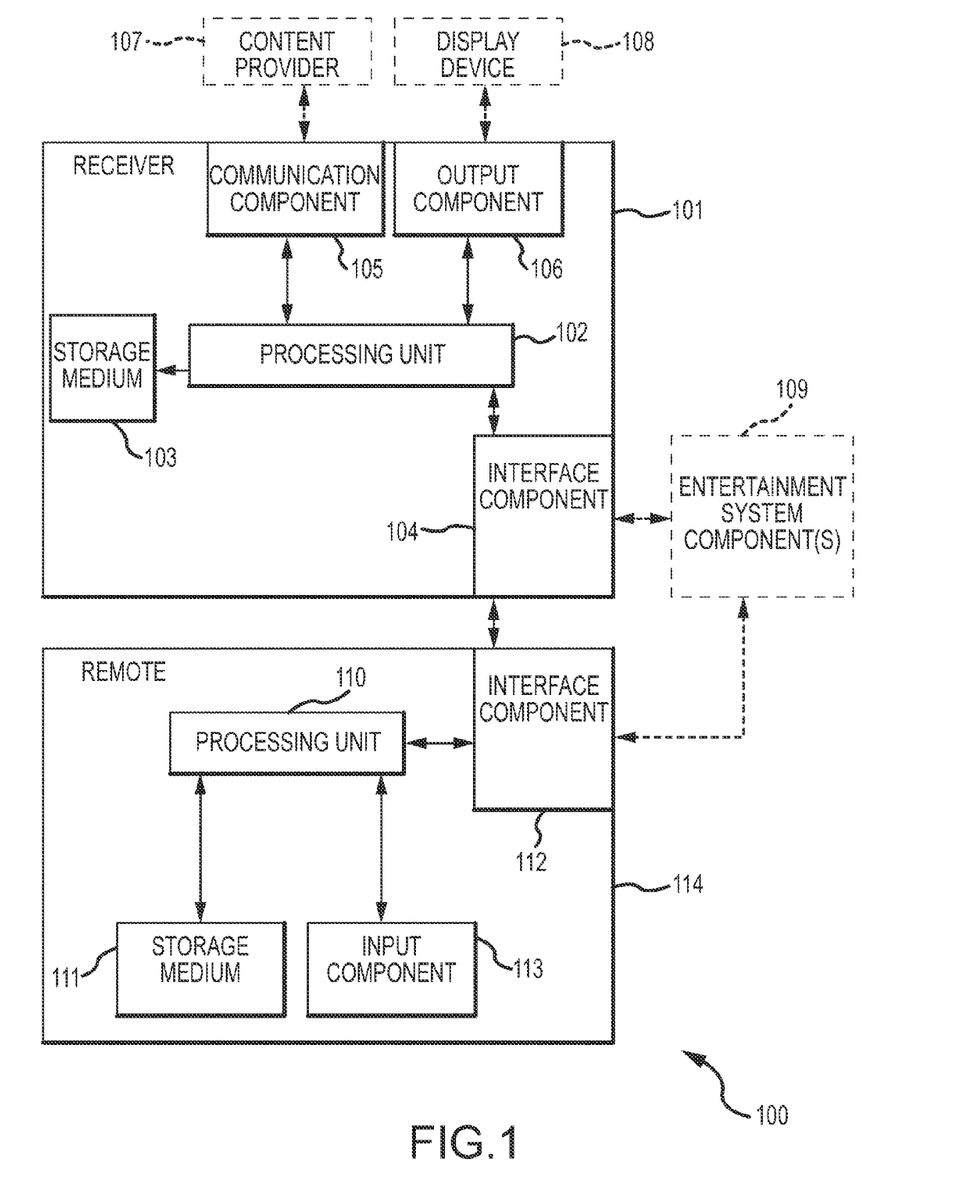
FIG. 1 is a block diagram illustrating a system for assisting remote control macros.

FIG. 1 is a block diagram illustrating a system 100 for creating, storing, and/or executing assisted remote control macros. The system 100 includes a receiver 101 and a remote control device 114. The receiver may be any device, such a programming receiver, television receiver, a set top box, a cable box, a computer, a digital video recorder, and so on, that processes programming content for display on an associated display device 108. The remote control device may be operable to transmit signals, to the receiver, that may direct the operation of the receiver. The receiver may be operable to receive such signals and may also transmit other signals to the remote control device, as discussed later.

The receiver 101 may include one or more processing units 102, a storage medium 103 (which may be any non-transitory machine-readable storage medium), one or more interface components 104, a communication component 105, and an output component 106. The one or more processing units may execute software instructions stored in the storage medium to perform one or more receiver functions. The output component may be wired and/or wirelessly coupled to a display device 108 which may be a liquid crystal display, a cathode ray tube display, a television, and so on. As one example, the output component may be a port with a hardwired connection to the display device. The communication component may be wired and/or wirelessly coupled to a content provider 107 (such as a cable television provider, a satellite television provider, an Internet provider, and so on) via a communication connection such as a cable connection, satellite connection, Internet connection, and so on. The communication component may receive content (such as programming content, Internet content, and so on) from the content provider. The one or more processing units may store content received by the communication component in the storage medium. The one or more processing units may also display content received by the communication component and/or stored in the storage medium on the display device utilizing the output component. The interface component may receive one or more signals (such as infrared signals, radio frequency signals, and so on) from the remote control device 114 and may transmit one or more signals to the remote control device, the display device, and/or one or more entertainment system components 109 (such as DVD players, video cassette recorders, laser disc players, blue-ray disc players, high-definition DVD players, digital video recorders, video game systems, surround sound systems, audio systems, televisions, and so on). The one or more processing units may perform one or more operations in response to receiving signals from the remote control device.

The remote control device 114 may include one or more processing units 110, a storage medium 111, one or more input components 113, and one or more interface components 112. The one or more processing units may be operable to execute software instructions stored in the storage medium to perform one or more remote control device functions. The input component may be wired and/or wirelessly coupled to one or more input devices (not shown) incorporated into (or associated with) the remote control device and operable to receive user input. Examples include a keyboard, one or more buttons, a keypad, a virtual keyboard, a virtual keypad, a touch screen, a remote control, a mouse, a trackball, a track pad, and so on. The input component may receive input from a user and may transmit signals (such as infrared signals, radio frequency signals, and so on) to the receiver 101, the display device 108, and/or the one or more entertainment system components 109 via the interface component. The remote control device may also receive signals from the receiver directing the operation of the remote control device.

In one embodiment, the receiver 101 may execute a macro recording program stored in the storage medium 103 in response to user input received from the remote control device 114. The user input may be an indication that a user has selected a "record macro" button or selection element of the remote control device. Alternatively, the user input may be an indication that the user has selected a "record macro" element of a menu displayed by the receiver on the display device 108.

The receiver 101 may then record user input received from the remote control device 114 utilizing a macro recording program. The user input may specify a sequence of actions to include in a user-defined macro. The sequence of actions may include actions to be performed by the receiver, the remote control device, the display device 108, one or more of the entertainment system components 109, and so on. The user input may include user selections of one or more buttons or selection elements of the remote control device. Alternatively, the user input may include user selections of one or more menu elements of a menu displayed by the receiver on the display device. For example, the macro recording program may display a menu of actions that the user may opt to include in the macro.

After recording the user input, the receiver 101 may create a macro based at least partially thereon. For example, the user may not specify essential operations (such as powering on a device, changing an input on a device, and so on) and the receiver may supplement the user input with missing essential operations when creating the macro. By way of another example, the receiver may include additional operations that the user has not specified, such as an operation of incrementing a counter when the macro is performed so that the number of times a user accesses a user-defined macro can be tracked even if the user is not concerned with such data. The created macro may include the sequence of actions specified by the user input. The receiver may associate the created macro with a button or selection element of the remote control device and/or a menu element of a menu operable to be displayed by the receiver on the display device 108. The receiver may also transmit the created macro to a storage medium for storage. The storage medium may be the storage medium 103 of the receiver. Alternatively, the storage medium may be the storage medium 111 of the remote control device and the receiver 101 may transmit the created macro via the interface component 104.

Subsequently, the user may trigger execution of the stored macro. For example, the user may trigger execution of the stored macro by selecting a corresponding selection element of the remote control device 114 or a corresponding menu element of a menu displayed by the receiver on the display device 108. In some implementations of this embodiment, the remote control device 114 may execute the stored macro. In such implementations of this embodiment, if the stored macro is stored in the storage medium 103 of the receiver 101, the remote control device may request and receive the stored macro from the receiver before execution. However, if the stored macro is stored in the storage medium 111 of the remote control device, the remote control device may load the stored macro from the storage medium 111 for execution without communicating with the receiver.

In executing the macro, the remote control device 114 may transmit one or more signals via the interface component 112 to the receiver 101, the display device 108, and/or one or more of the entertainment system components 109, and so on. The signals may include instructions directing performance of one or more operations. Additionally, or alternatively, the remote control device may transmit one or more signals to the receiver specifying for the receiver to transmit one or more instructions to the display device, one or more of the entertainment system components, and so on.

In other implementations of this embodiment, the receiver 101 may execute the stored macro. In such implementations, if the stored macro is stored in the storage medium 111 of the remote control device 114, the receiver may request and receive the stored macro from the remote control device before execution. However, if the stored macro is stored in the storage medium 103 of the receiver, the receiver may load the stored macro from the storage medium 103 for execution without communicating with the remote control device.

In executing the macro, the receiver 101 may transmit one or more signals via the interface component 104 to any or all of the remote control device 114, the display device 108, one or more of the entertainment system components 109, and so on. The signals may include instructions directing performance of one or more operations. Additionally, or alternatively, the receiver may transmit one or more signals to the remote control device instructing the remote control device to transmit one or more instructions to the display device, one or more of the entertainment system components, and so on. In such a configuration, the remote control device effectively acts as a relay for commands from the receiver.

In another embodiment, the remote control device 114 may execute the macro recording program which may be stored in the storage medium 111. The remote control device may then record user input utilizing the macro recording program and create a macro based at least partially thereon. The remote control device may record the indicated selection(s).

In one example, the remote control device may direct the receiver to display a menu of actions on the display device 108 that the user may select to include in the macro utilizing the remote control device. The receiver may then indicate to the remote control device which selection(s) the user has made as the remote may be unaware which of the displayed menu items corresponded to user remote selections.

Subsequently, the user may select to trigger execution of the stored macro. In some implementations of this embodiment, the remote control device 114 may execute the stored macro and the remote control device may request and receive the stored macro from the receiver before execution. In executing the macro, the remote control device 114 may transmit one or more signals via the interface component 112 to the receiver 101, the display device 108, and/or one or more of the entertainment system components 109, and so on. Additionally, or alternatively, the remote control device may transmit one or more signals to the receiver specifying for the receiver to transmit one or more instructions to the display device, one or more of the entertainment system components, and so on. In other implementations of this embodiment, the receiver 101 may execute the stored macro. In such implementations, the receiver may load the stored macro from the storage medium 103 for execution.

Figure 2A:
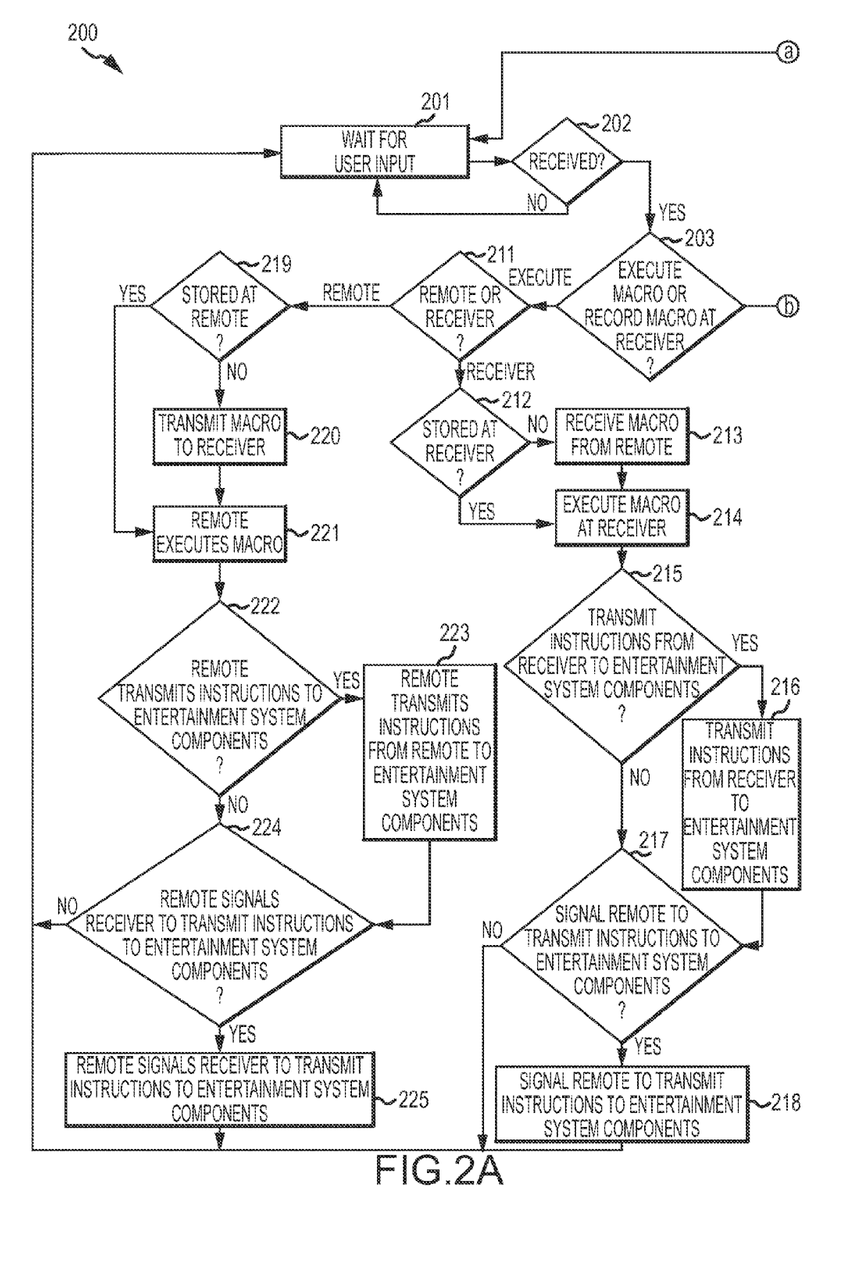
FIGS. 2A and 2B are a flow chart illustrating a first method of assisting remote control macros that may be performed by the system of FIG. 1.
Figure 2B:
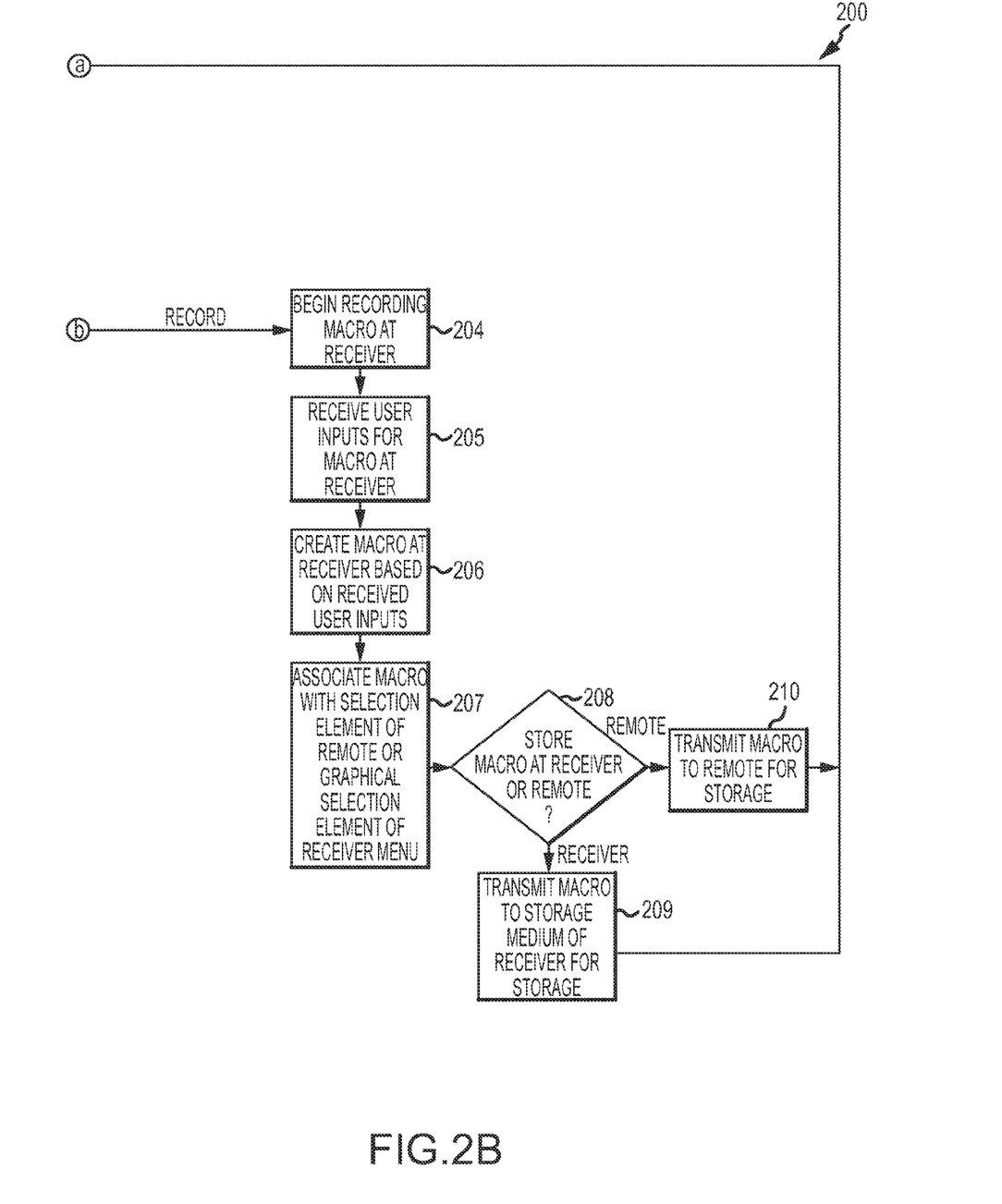

FIGS. 2A and 2B illustrate a first method 200 of assisting remote control macros which may be performed by the receiver 101. The flow begins at block 201 where the receiver 101 waits for input from the user. The flow then proceeds to block 202 where the receiver determines whether input from the user has been received. If input from the user has not been received, the flow returns to block 201 and the receiver waits for input from the user. If input from the user has been received, the flow proceeds to block 203.

At block 203, the receiver determines whether the input specifies to execute a macro or record a macro at the receiver. If the input specifies to execute a macro, the flow proceeds to block 211. If the input specifies to record a macro at the receiver, the flow proceeds to block 204.

At block 204, after the receiver 101 determines that user input specifies to record a macro at the receiver, the receiver begins recording the macro and the flow proceeds to block 205. At block 205, the receiver receives user input to record for the macro. The flow then proceeds to block 206 where the receiver creates the macro at least based on the received user input. Next, the flow proceeds to block 207 where the system 100 associates the created macro with a selection element of the remote control device 114 and/or a graphical selection element of a menu that the receiver is operable to display on the display device 108.

The flow then proceeds to block 208 where the receiver 101 determines whether to store the created macro at the receiver or the remote control device 114. If the receiver determines the created macro is to be stored at the remote control device, the flow proceeds to block 210 where the receiver transmits the created macro to the remote control device for storage. The flow then proceeds to block 201. If the receiver determines the created macro is to be stored at the receiver, the flow proceeds to block 209 where the receiver stores the created macro in the storage medium 103. The flow then returns to block 201 and the receiver waits for input from the user.

At block 211, after the receiver 101 determines that user input specifies to execute a macro, the receiver determines whether the macro will be executed utilizing the remote control device 114 or the receiver. If the receiver determines a macro is to be executed utilizing the remote control device, the flow proceeds to block 219. If the receiver determines a macro is to be executed utilizing the receiver, the flow proceeds to block 212.

At block 212, the receiver 101 determines whether the macro to execute is stored in the storage medium 103 of the receiver. If the macro is stored in the storage medium of the receiver, the flow proceeds to block 214. If the macro is not stored in the storage medium of the receiver, the receiver requests the macro and the flow proceeds to block 213 where the receiver receives the macro from the remote control device 114. The flow then proceeds to block 214 where the receiver executes the macro. Next, the flow proceeds to block 215.

At block 215, the receiver 101 determines whether to transmit instructions to one or more entertainment system components as part of executing the macro. If the receiver determines to transmit instructions to one or more entertainment system components, the flow proceeds to block 216 where the receiver transmits the instructions. The flow then proceeds to block 217.

If the receiver determines not to transmit instructions to one or more entertainment system components, the flow proceeds from block 215 to block 217 where the receiver determines whether to signal the remote control device 114 to transmit instructions to one or more entertainment system components. If the receiver determines to signal the remote control device to transmit instructions, the flow proceeds to block 218. At block 218, the receiver signals the remote control device to transmit the instructions and the flow proceeds to block 201. If the receiver determines not to signal the remote control device to transmit instructions, the flow proceeds from block 217 to block 201.

At block 219, after the receiver 101 determines a macro is to be executed utilizing the remote control device 114, the remote control device determines whether the macro for the remote control device to execute is stored in the storage medium 111 of the remote control device. If the macro is stored in the storage medium of the remote control device, the flow proceeds from block 219 to block 221. If the macro is not stored in the storage medium of the remote control device, the receiver 101 transmits the macro to the remote control device at block 220. The flow then proceeds to block 221 where the remote control device executes the macro. Next, the flow proceeds to block 222.

At block 222, remote control device 114 determines whether to transmit instructions to one or more entertainment system components as part of executing the macro. If the remote control device determines to transmit instructions, the flow proceeds to block 223 where the remote control device transmits the instructions. The flow then proceeds to block 224.

If the remote control device 114 determines at block 222 not to transmit instructions, the flow proceeds from block 222 to block 224 where the remote control device determines whether to signal the receiver 101 to transmit instructions to one or more entertainment system components. If the remote control device determines to signal the receiver to transmit instructions, the flow proceeds to block 225. At block 225, the remote control device signals the receiver to transmit the instructions. The flow then returns to block 201 and the receiver waits for input from the user. If the remote control device determines not to signal the receiver to transmit instructions, the flow proceeds from block 224 to block 201 and the receiver waits for input from the user.

Figure 3A:
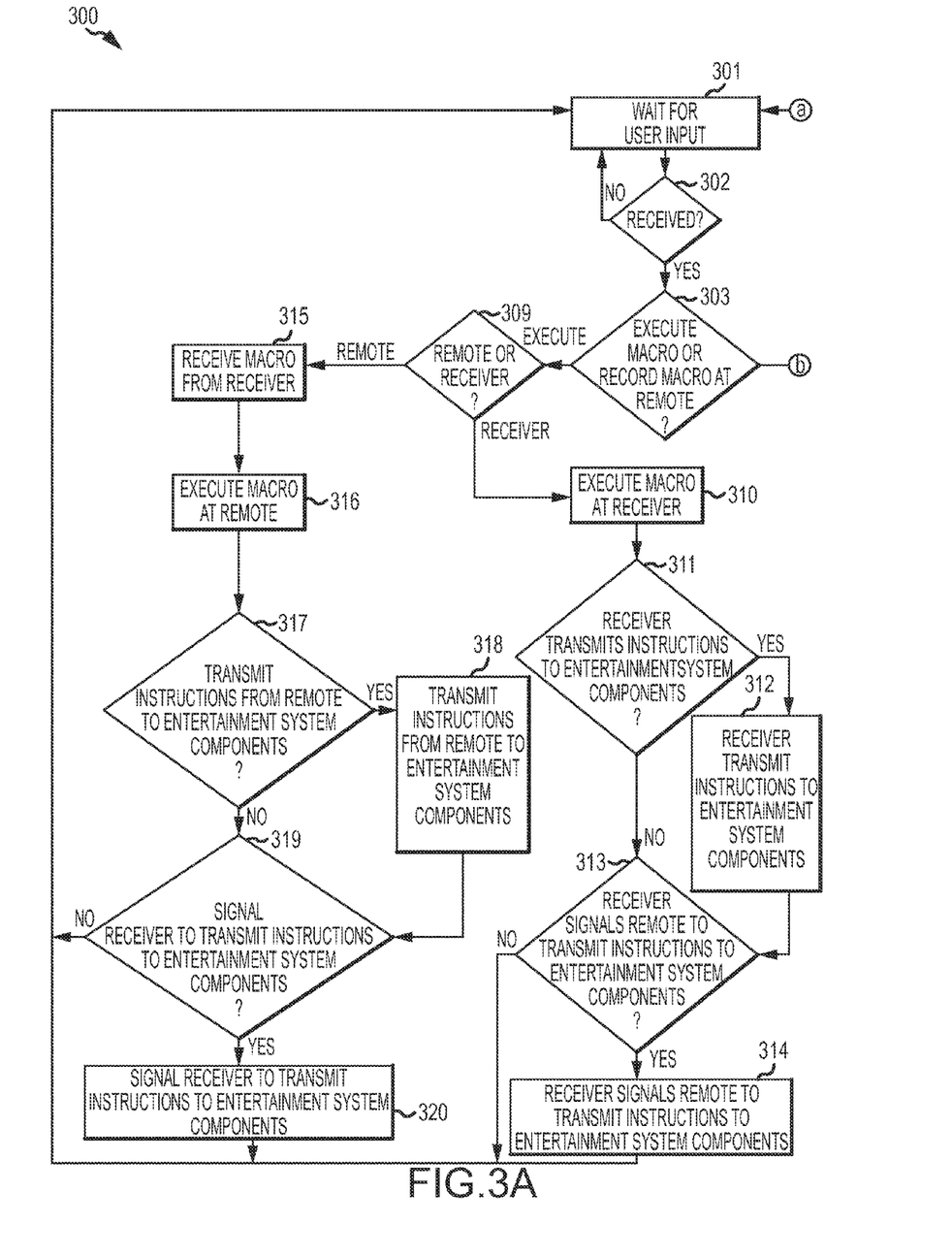
FIGS. 3A and 3B are a flow chart illustrating a second method of assisting remote control macros that may be performed by the system of FIG. 1.
Figure 3B:
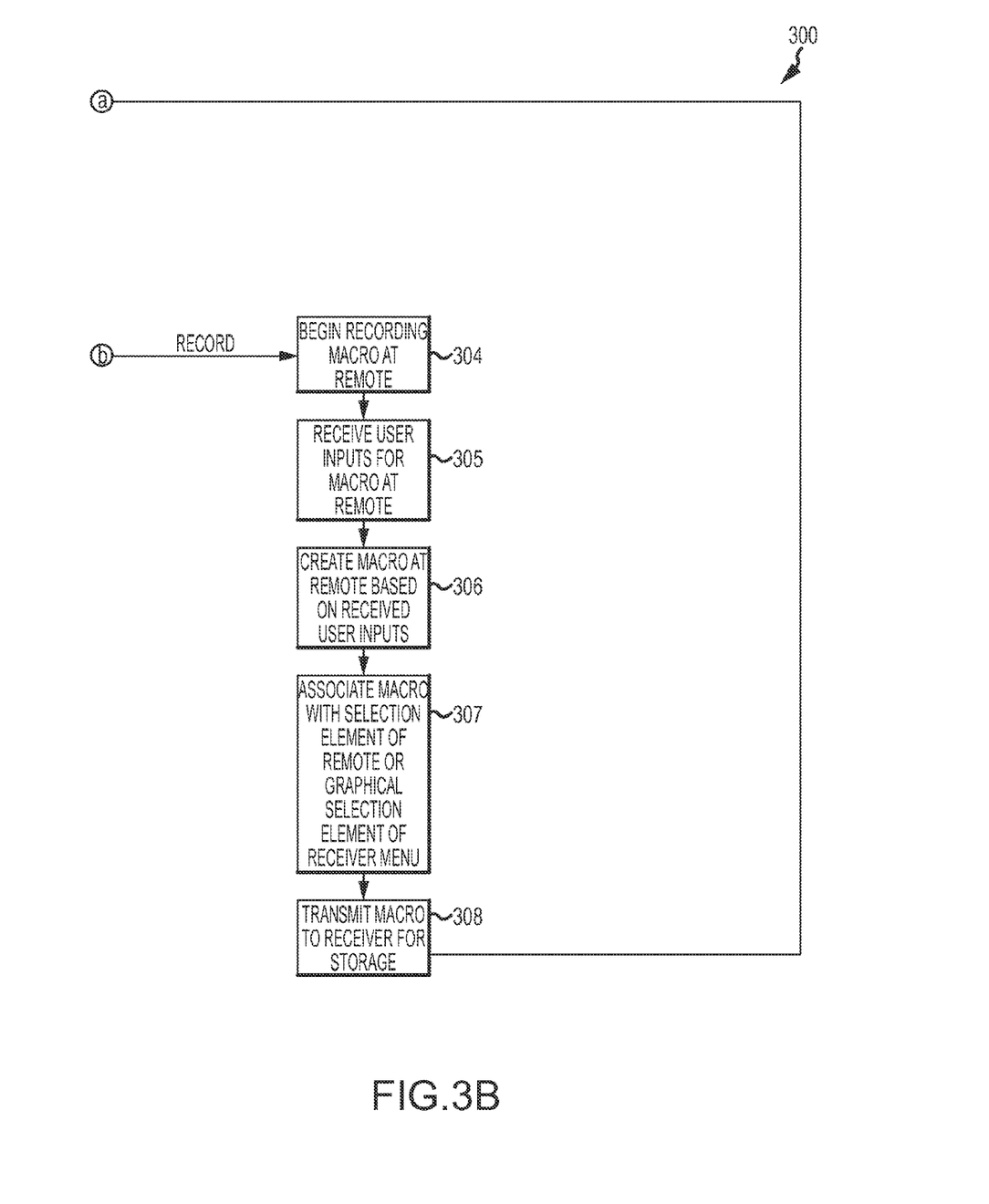

FIGS. 3A and 3B illustrate a second method 300 of assisting remote control macros which may be performed by the remote control device 114. The flow begins at block 301 where the remote control device waits for input from the user. The flow then proceeds to block 302 where the remote control device determines whether input from the user has been received. If input from the user has not been received, the flow returns to block 301 and the remote control device waits for input from the user. If input from the user has been received, the flow proceeds to block 303.

At block 303, the remote control device 114 determines whether the input specifies to execute a macro or record a macro at the remote control device. If the input specifies to execute a macro, the flow proceeds to block 309. If the input specifies to record a macro at the remote control device, the flow proceeds to block 304.

At block 304, the remote control device 114 begins recording the macro and the flow proceeds to block 305. At block 305, the remote control device receives user input to record for the macro. The flow then proceeds to block 306 where the remote control device creates the macro at least based on the received user input. Next, the flow proceeds to block 307 where the remote control device associates the created macro with a selection element of the remote control device and/or a graphical selection element of a menu that the receiver 101 is operable to display on the display device 108. The flow then proceeds to block 308 where the remote control device transmits the created macro to the receiver for storage. Next, the flow returns to block 301 and the remote control device waits for input from the user.

At block 309, after the remote control device 114 determines that the input specifies to execute a macro, the remote control device determines whether a macro is to be executed utilizing the remote control device or the receiver 101. If the remote control device determines the macro is to be executed utilizing the remote control device, the flow proceeds to block 315. If the remote control device determines the macro is to be executed utilizing the receiver, the flow proceeds to block 310.

At block 310, the receiver 101 loads the macro from the storage medium 103 and executes the macro. The flow then proceeds to block 311. At block 311, the receiver determines whether to transmit instructions to one or more entertainment system components as part of executing the macro. If the receiver determines to transmit instructions to one or more entertainment system components, the flow proceeds to block 312 where the receiver transmits the instructions. The flow then proceeds to block 313. If the receiver determines not to transmit instructions to one or more entertainment system components, the flow proceeds from block 311 to block 313 where the receiver determines whether to signal the remote control device 114 to transmit instructions to one or more entertainment system components. If the receiver determines to signal the remote control device to transmit instructions, the flow proceeds to block 314. At block 314, the receiver signals the remote control device to transmit the instructions and the flow returns to block 301 and the remote control device waits for input from the user. If the receiver determines not to signal the remote control device to transmit instructions, the flow returns from block 313 to block 301 and the remote control device waits for input from the user.

At block 315, after remote control device 114 determines the macro is to be executed utilizing the remote control device, the remote control device requests and receives the macro from the receiver 101. The flow then proceeds to block 316 where the remote control device executes the macro. Next, the flow proceeds to block 317 where the remote control device determines whether to transmit instructions to one or more entertainment system components as part of executing the macro. If the remote control device determines to transmit instructions, the flow proceeds to block 318 where the remote control device transmits the instructions. The flow then proceeds to block 319. If the remote control device determines not to transmit instructions, the flow proceeds from block 317 to block 319. At block 319, the remote control device determines whether to signal the receiver to transmit instructions to one or more entertainment system components. If the remote control device determines to signal the receiver to transmit instructions, the flow proceeds to block 320 where the remote control device signals the receiver to transmit the instructions. The flow returns to block 301 and the remote control device waits for input from the user. If remote control device determines not to signal the receiver to transmit instructions, the flow returns from block 319 to block 301 and the remote control device waits for input from the user.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method comprising:
   receiving a plurality of user inputs at a receiver from a remote control device, the plurality of user inputs specifying a sequence of actions to include in a user-defined macro for the remote control device;
   creating the user-defined macro, by the receiver, the user-defined macro including the sequence of actions;
   in response to a request for the user-defined macro initiated from the remote control device, transmitting the user-defined macro from the receiver to the remote control device;
   storing the user-defined macro in a memory local to the remote control device; and
   executing the user-defined macro on the remote control device.

2. The method of claim 1, further comprising receiving at least one instruction from the remote control device related to the user-defined macro when the remote control device executes the transmitted user-defined macro.

3. The method of claim 2, wherein the at least one instruction instructs the receiver to transmit at least one command from the receiver to at least one entertainment system component.

4. The method of claim 1, further comprising associating the stored user-defined macro with at least one of a selection element of the remote control device and a graphical selection element of a menu generated by the receiver.

5. The method of claim 1, wherein at least one of the plurality of user inputs corresponds to a user selection of a graphical selection element of a menu generated by the receiver.

6. A system comprising:
   a remote control device, comprising:
     a remote control input operable to receive a plurality of user inputs specifying a sequence of actions to include in a user-defined macro;
     a remote control output;
     a remote control memory local to the remote control device for storing one or more user-defined macros;
     a remote control processor local to the remote control device for executing macros;
     and
   a receiver, comprising:
     a receiver input operable to receive the plurality of user inputs from the remote control output;
     a receiver processing unit operable to record the plurality of user inputs, create the user-defined macro including the sequence of actions, and execute the user-defined macro responsive to a subsequent user request received from the remote control device;
     a receiver output operable to transmit the user-defined macro to the remote control device in response to a request for the user-defined macro initiated from the remote control device.

7. The system of claim 6, wherein the receiver processing unit executes the user-defined macro after receiving the user-defined macro from the remote control output.

8. The system of claim 6, wherein the receiver further includes at least one storage medium and wherein the receiver processing unit stores the user-defined macro in the at least one storage medium when the user-defined macro is created.

9. The system of claim 8, wherein the receiver processing unit executes the user-defined macro stored in the at least one storage medium in response to the subsequent user request.

10. The system of claim 6, wherein said executing the user defined-macro causes the receiver output to transmit at least one instruction to at least one entertainment system component.

11. The system of claim 6, wherein said executing the user defined-macro causes the receiver output to instruct the remote control device to transmit at least one instruction to at least one entertainment system component.

12. The system of claim 6, where the stored user-defined macro is associated with at least one of a selection element of the remote control device and a graphical selection element of a menu generated by the receiver.

13. A method comprising:
creating a user-defined macro at a remote control device by recording a plurality of user inputs at the remote control that specify a sequence of actions;
storing the user-defined macro in the local memory of the remote control device;
transmitting the user-defined macro to a receiver for storage; and
receiving the stored user-defined macro from the receiver in response to a request submitted by the remote control device wherein the request is initiated based on a received user input that requests execution of the stored user-defined macro.

14. A method comprising:
receiving a plurality of user inputs at a receiver from a remote control device, the plurality of user inputs specifying a sequence of actions to include in a user-defined macro for the remote control device;
creating the user-defined macro, by the receiver, the user-defined macro including the sequence of actions;
transmitting the user-defined macro from the receiver to the remote control device in response to an execution request received at the remote control device from a user;
storing the user-defined macro in a memory local to the remote control device; and
executing the user-defined macro on the remote control device.

15. A method comprising:
creating a user-defined macro at a remote control device by recording a plurality of user inputs that specify a sequence of actions;
storing the user-defined macro in the local memory of the remote control device;
transmitting the user-defined macro to a receiver for storage;
receiving the stored user-defined macro from the receiver in response to a request submitted by the remote control device wherein the request is submitted based on a received user input that requests execution of the stored user-defined macro; and
executing the received user-defined macro utilizing the remote control device.

\* \* \* \* \*